US006537167B1

(12) United States Patent
Gazyakan et al.

(10) Patent No.: US 6,537,167 B1
(45) Date of Patent: Mar. 25, 2003

(54) ELECTRICAL INDIVIDUAL WHEEL DRIVE WITH SEVERAL MOTORS

(75) Inventors: Unal Gazyakan, Friedrichshafen (DE); Michael Roske, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 30 days.

(21) Appl. No.: 09/644,469

(22) Filed: Aug. 23, 2000

Related U.S. Application Data

(60) Division of application No. 09/366,908, filed on Aug. 4, 1999, now Pat. No. 6,139,464, which is a continuation-in-part of application No. 09/004,874, filed on Jan. 9, 1998.

(30) Foreign Application Priority Data

Mar. 8, 1997 (DE) .......................................... 197 09 577

(51) Int. Cl.[7] ............................. F16H 3/72; B60K 17/04
(52) U.S. Cl. ........................................... 475/5; 180/372
(58) Field of Search ................................. 475/5, 8, 207, 475/317; 180/65.1, 65.6, 65.5, 370, 371, 372

(56) References Cited

U.S. PATENT DOCUMENTS

| 3,365,986 | A | * | 1/1968 | Mazziotti | 180/372 X |
| 3,434,364 | A | * | 3/1969 | Keese | 180/372 X |
| 3,561,544 | A | * | 2/1971 | Farmer | 74/675 X |
| 3,799,284 | A | * | 3/1974 | Hender | 475/5 X |
| 4,170,150 | A |   | 10/1979 | Selbach et al. | |
| 4,437,530 | A |   | 3/1984 | De Young et al. | |
| 4,779,486 | A | * | 10/1988 | Schumacher | 180/65.6 X |
| 4,799,564 | A | * | 1/1989 | Iijima | 180/65.5 |
| 4,843,910 | A |   | 7/1989 | Loeber et al. | |
| 4,964,681 | A | * | 10/1990 | Burgdorf et al. | 303/116 |
| 5,014,800 | A | * | 5/1991 | Kawamoto et al. | 180/65.5 |
| 5,195,600 | A | * | 3/1993 | Dorgan | 475/5 X |
| 5,382,854 | A | * | 1/1995 | Kawamoto et al. | 180/65.5 X |
| 5,472,059 | A |   | 12/1995 | Schlosser et al. | |
| 5,691,584 | A |   | 11/1997 | Toida et al. | |
| 5,769,751 | A |   | 6/1998 | Forster | |
| 5,924,506 | A |   | 7/1999 | Perego | |
| 6,006,870 | A |   | 12/1999 | Gazyakan et al. | |
| 6,022,287 | A | * | 2/2000 | Klemen et al. | 475/5 |
| 6,149,249 | A | * | 11/2000 | Matsuda | 303/115.2 |
| 6,328,123 | B1 | * | 12/2001 | Niemann et al. | 180/65.5 |

FOREIGN PATENT DOCUMENTS

| DE | 21 09 372 | 9/1972 |
| DE | 26 30 206 C2 | 3/1978 |

* cited by examiner

Primary Examiner—Saul Rodriquez
Assistant Examiner—Roger Pang
(74) Attorney, Agent, or Firm—Davis & Bujold, P.L.L.C.

(57) ABSTRACT

The invention relates to an electrical individual wheel drive having several electromotors (1) whose input power is combined by a spur gear assembly (2) and one rear-mounted planetary gear (3) which adapts the input torque and the wheel speed. The wheel bearings (4) are mounted axially between the electromotors (1) and planetary gear (3). One brake (7) is a pneumatically or hydraulically actuated disc brake and acts as service, parking, emergency and auxiliary brake.

12 Claims, 5 Drawing Sheets

ELECTRICAL INDIVIDUAL WHEEL DRIVE WITH SEVERAL MOTORS

This application is a DIV of application Ser. No. 09/366,908, U.S. Pat. No. 6,139,464, filed on Aug. 4, 1999, which is a CIP of application Ser. No. 09/004,874 filed on Jan. 9, 1998, which claims the priority of German application 19709577.1 filed on Mar. 8, 1997.

The invention concerns an individual wheel drive with a rear-mounted planetary gear for motor vehicles. Individual wheel drives with rear-mounted planetary gear are known already, an example of such an individual wheel drive being given in German Patent No. 26 30 206.

Those individual wheel drives with a rear-mounted planetary gear can be used, for example, in short-distance buses. Since, in this transmission system, the otherwise usual axle-beam housing for an axle input and a differential are eliminated, it is possible to build buses with a very low floor level. In the former, driving drafts for low-floor buses with individual wheel drives, the size of the prime mover and of the actuating devices for the brake are disadvantageous since they make large wheel wells necessary and narrow down the passage into the floor of the bus to the height of the wheels. For optimally building the body of a vehicle in accordance with the work space, it can prove necessary to fit the primary mover or a bunched up transmission system of several engines offset relative to the wheel axle.

The problem on which the invention is based is to provide an individual wheel drive with a rear-mounted planetary gear which, as a result of the drive unit being fitted offset relative to the wheel axle, makes an optimal use of the interior of the vehicle possible and in which said axle offset is compensated in the planetary gear.

This problem is solved by an individual wheel drive according to the preamble of the main claim and having the characteristic features thereof.

According to the invention, the individual wheel drive for a vehicle comprises at least one planetary gear with one sun gear, one ring gear and one planet carrier. The ring gear drives a wheel hub on which is fastened a single or dual wheels. Wheel bearings rotatably support said wheel hub. The individual wheel drive, according to the invention, in addition comprises one brake, one brake caliper and one brake-actuating device. A prime mover or a bunched up input of several engines produces the input power. The shaft of the prime mover or of the bunched up input by several engines is offset with respect to the wheel axle in order to design optimally the whole space required by the input and the brake-actuating device so that the wheel well affects the interior of the vehicle as little as possible. Said axle offset is again compensated in the planetary gear by offsetting the axle of the sun gear from that of the ring gear 15 and planet carrier 16 respectively. The axle of the ring gear coincides with the wheel hub and thus with the wheel axle.

In an advantageous development of the invention, planetary wheels of different diameters grip the sun gear and the ring gear. An offset between the axles of sun gear and the ring gear and planet carrier respectively thereby results. Said planetary gear can have, for example, two planetary wheels of different diameters. In another embodiment, it contains three planetary wheels of different diameters. From a technically logical point of view, said embodiment is, of course, possible only for a small axle offset. At the same time, in a symmetrical arrangement, two of the three planetary wheels can have the same diameter. Embodiments with more than three planetary wheels are also conceivable.

In this individual wheel drive the input is preferably electric. A possible use is in driven rear wheels combined with rigid axle systems for dual or single tires.

In an advantageous embodiment of the invention, the input power of a large electromotor is distributed over several smaller ones. Their respective input power is concentrated by a spur-gear collective drive. The individual, smaller electromotors are axially short so that the whole driving unit projects less in the direction of the interior of the bus. The through width of the interior of the vehicle is thus increased to the height of the wheels with the same total width of the vehicle. The adaptation to the required wheel torque and the wheel speed is effected by the rear-mounted planetary gear. The spur gear of the spur-gear collective drive on the output side is preferably connected with the sun gear of the planetary gear by a gear intermediate shaft. The wheel bearing, which rotatably supports the wheel hub, is advantageously situated between the spur-gear collective drive and the planetary gear. The rims are secured to the wheel hub.

The prime mover(s) are preferably cooled by air, water, oil or other means.

In an advantageous design of the invention, an input from several engines can be separately controlled. This makes possible a greater effectiveness in the intermediate load area in comparison with a one-engine individual wheel drive. The distribution of the input power of the individual wheel drive over several engines of less power which are made shorter than engines of stronger power offers, together with the reduction of the total length of the individual wheel drive, still other advantages: in the case of failure of a prime mover in the wheel head, operation via the remaining engines is still possible. In addition, advantages in cost result by using engines which are in the performance class of prime movers of passenger cars and can thereby be mass produced.

In an advantageous development of the invention, the brake of the individual wheel drive is designed as a pneumatically or hydraulically actuated disc brake and, in the same manner, acts as a service, parking, emergency or auxiliary brake.

The brake caliper is preferably placed beneath the horizontal central line of the wheel. It is advantageously in a circular section between 150° and 210°, the normal vector of the circular disc pointing in the direction of the wheel axle and the angle being measured by the radius vector pointing vertically upward, that is, in direction of the vehicle vertical axle. The brake-actuating device is here designed as a combined diaphragm and spring-accumulator cylinder. It is situated in a hollow axle body in an axle direction. The assembled wheel head is protected against impact by its position within the hollow axle body.

The parking brake advantageously has an emergency release device which is accessible from below through a handhole in the axle body. In the case of failure of the vehicle's own pressurized air, said emergency release device must be used in order to render towing of the vehicle possible.

Embodiments of the invention are shown in the drawings. They are:

FIG. 1 is a section through an individual wheel drive with several engines, one spur-gear collective drive which combines their input power, the axle of the spur-gear collective drive being offset relative to the wheel axle, and one planetary gear which, by means of its planetary wheels of different diameters and its sun gear connected with the spur-gear collective drive by an eccentrically mounted gear intermediate shaft, compensates for the axle offset between spur-gear collective drive and wheel axle;

Figure 1:
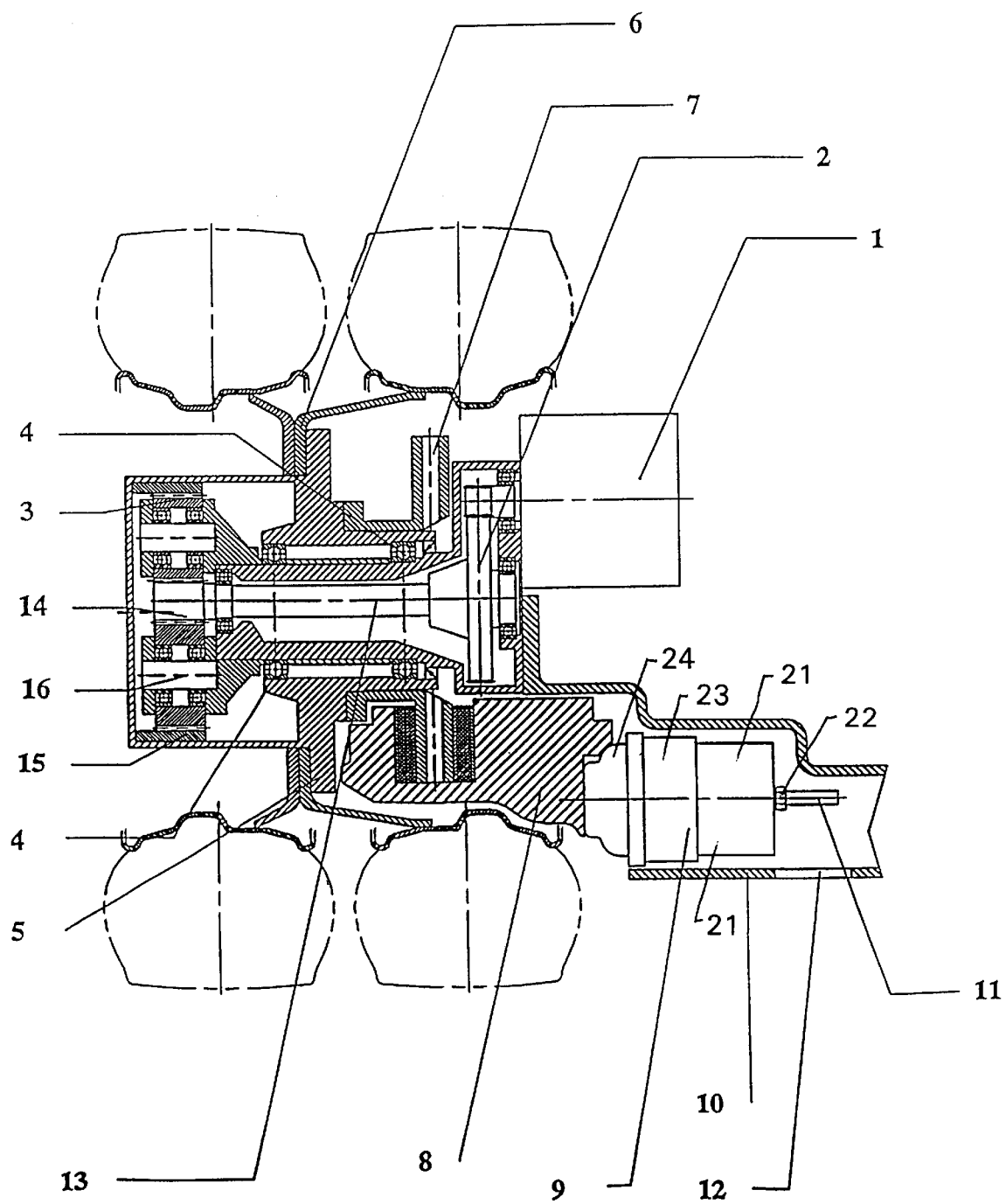
Figure 2:
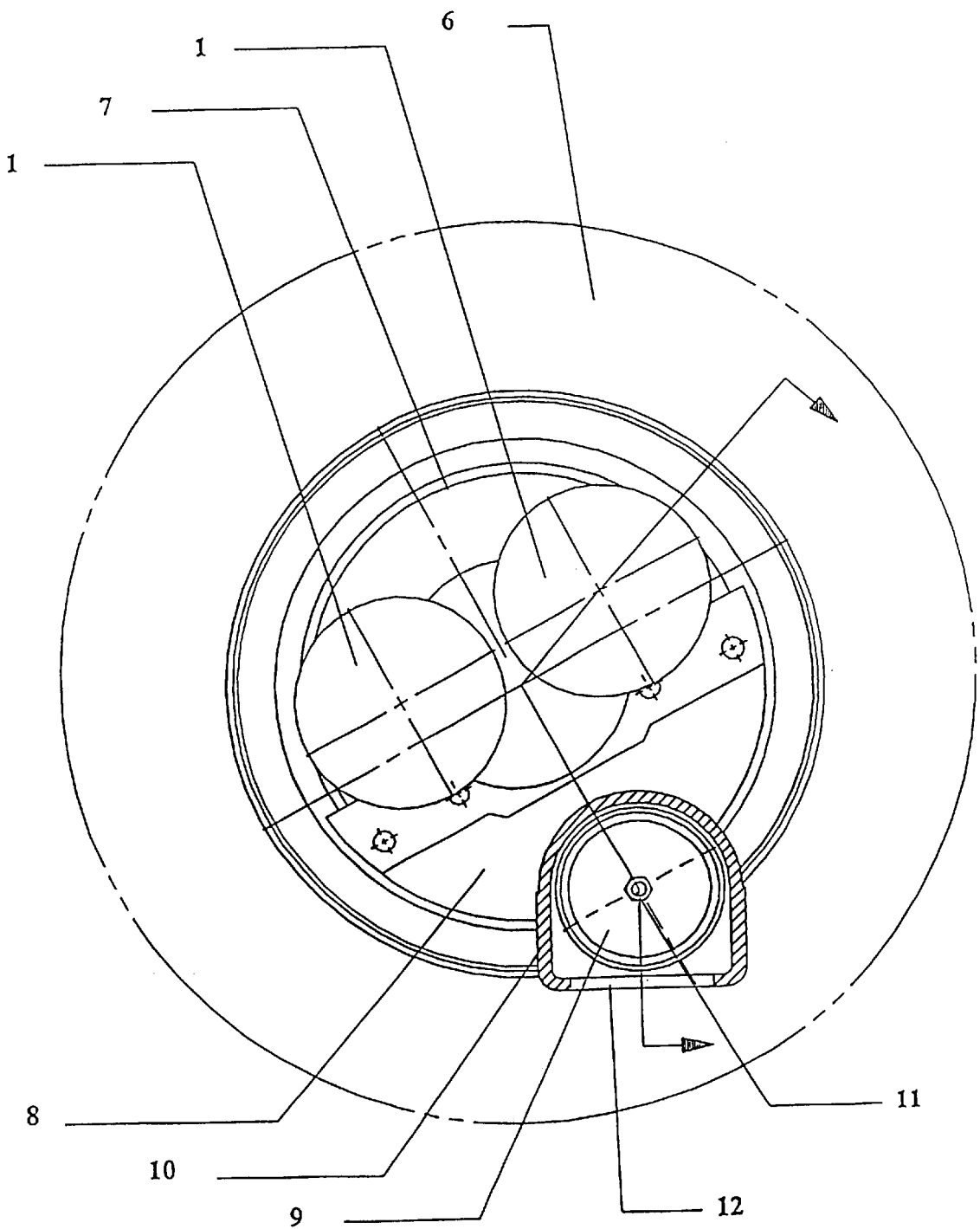
FIG. 2 is a section perpendicular to the wheel axle through an individual wheel drive with two eccentrically situated engines and with one disc brake arrangement in which the brake-actuating device is situated in a hollow axle body in an axle direction.
Figure 3:
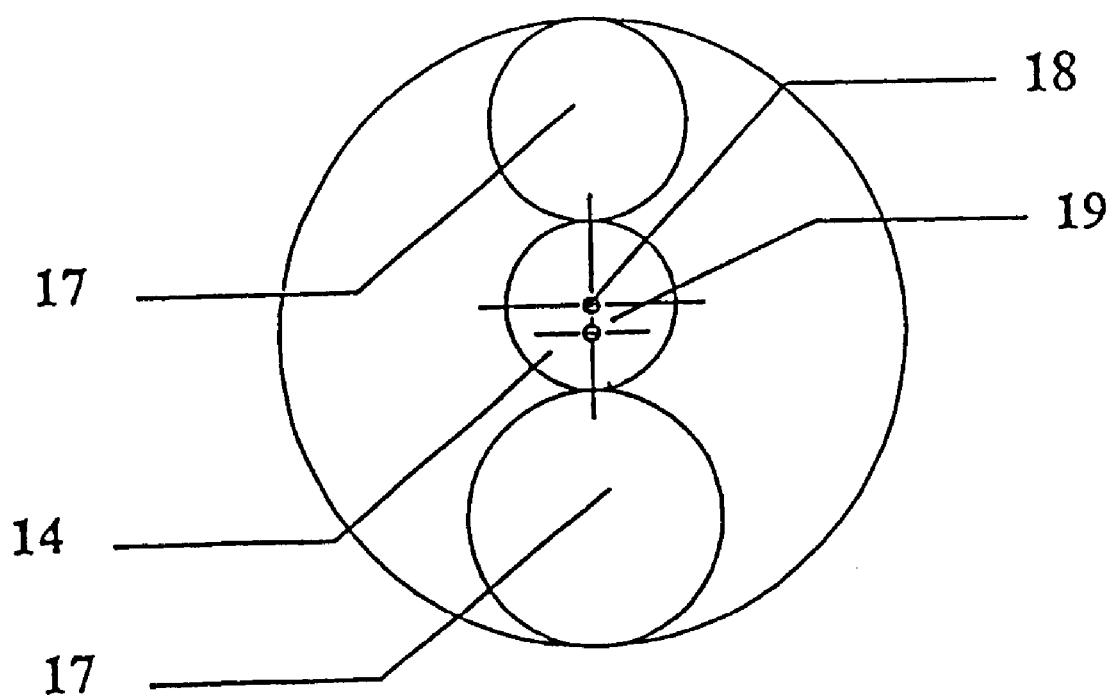
FIG. 3 is a diagrammatical partial section through a planetary gear with two planetary wheels of different diameter and one eccentrically supported sun gear.
Figure 4:
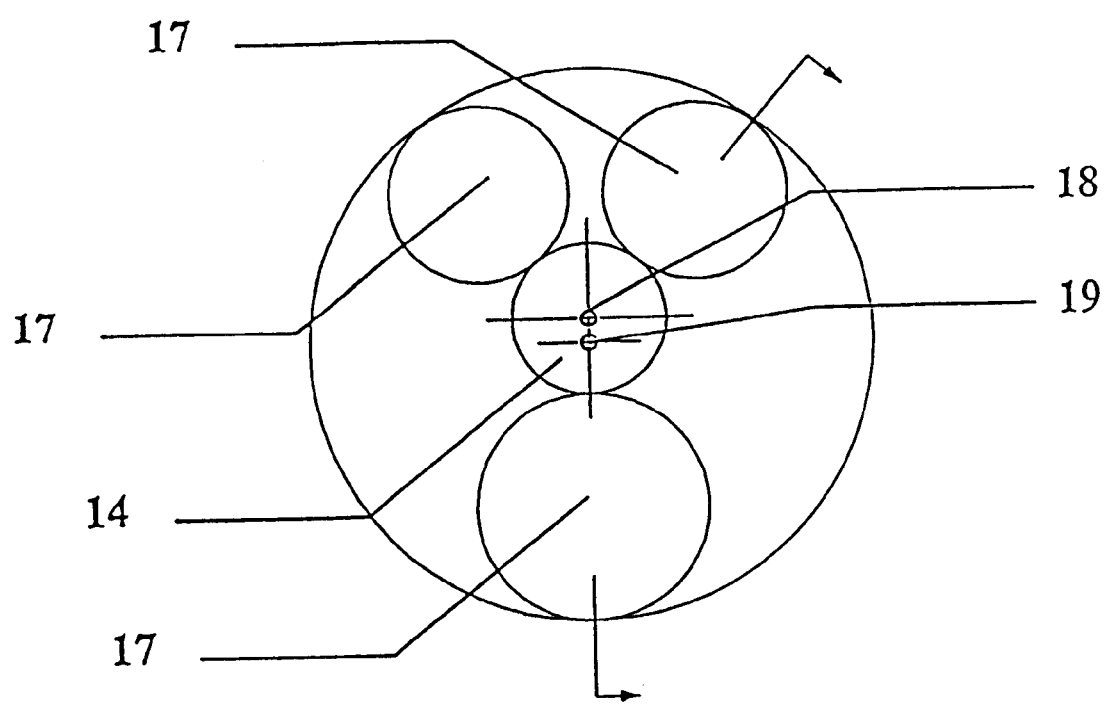
Figure 5:
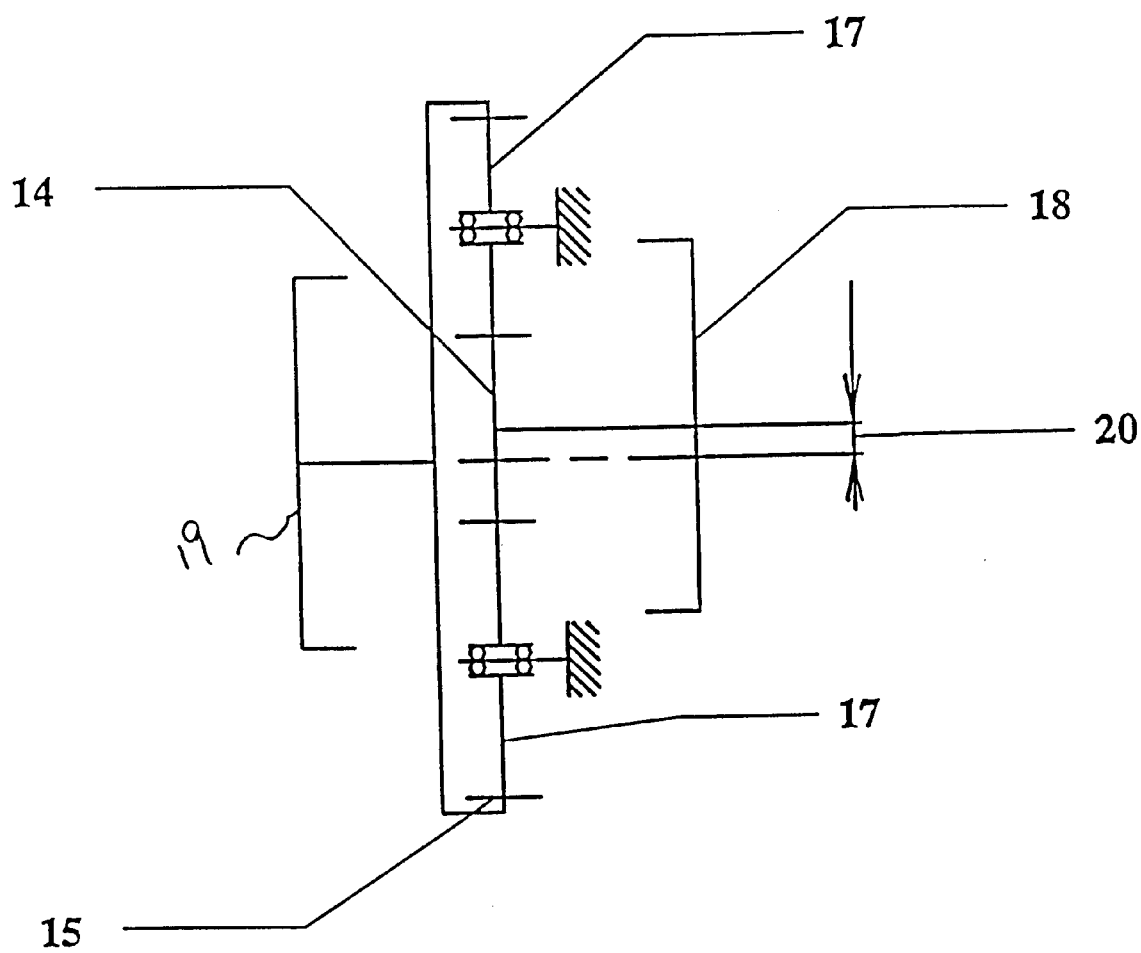

FIG. 4 is a diagrammatical partial section through a planetary gear with three planetary wheels of which two have the same diameter and another has a different diameter and an eccentrically supported sun gear; and FIG. 5 is a diagrammatical section through a planetary gear with two planetary wheels of different diameters and one eccentrically supported sun gear in which the axle of the wheel lies in the section of plane.

In one embodiment of the in on, two prime movers 1 drive a spur-gear collective drive 2 which is connected by a gear intermediate shaft 13 with the sun-gear 14 of a planetary gear 3. The axle of the spur-gear collective drive 2, which coincides with the axles of the gear intermediate shaft 13 and of the sun gear 14, is shifted around an axle offset 20 in relation to the axle of the ring gear 15 and planet carrier 16 respectively which coincides with the axle of the wheel hub 5 and thus the axle of the wheel. The planetary gears 17 have different diameters so that the sun gear 14 lies eccentrically in relation to the ring gear 15 and planet carrier 16 respectively. The ratio of the number of teeth of the planetary wheels 17 of different diameters is measured so that the eccentric position of the sun gear 14 that results therefrom, that is, of the input 18 in relation to the output 19, precisely corresponds to the axle offset 20. The planet carrier 16 of the planetary gear 3 is stationary. The ring gear 15 drives two tire rims 6 via a wheel hub. The wheel bearing 4, which rotatably supports the wheel hub 5, is axially mounted between the spur-gear collective drive 2 and the planetary gear 3. A brake 7, preferably designed as pneumatically actuated disc brake, carries out the functions of a service, parking, emergency and auxiliary brake. The brake caliper 8 is situated below the horizontal central line of the wheel. It is in a circle section between 150° and 210°, the normal vector of the circular disc pointing in the direction of the wheel axle and the angle being measured by a radius vector pointing vertically upward, that is, in the direction of the high axle of the vehicle. The brake-actuation 9 is designed as a combined diaphragm 24 and spring accumulator cylinder 23 which is situated in an axle direction and when the wheel head is assembled it is protected by a hollow axle body 10. In a technical variant of this, the brake actuator (9) is formed by two separate hydraulic cylinders 21, and a spring-loaded piston 22 actuates a parking brake and a pressure-loaded piston actuates a service brake. An emergency release device 11 of the parking brake, which in the case of failure of the vehicle own pressurized air system makes possible towing of the vehicle, is accessible from below through a handhole 12 of the axle body 10.

| Reference numerals | |
|---|---|
| 1 | prime mover |
| 2 | spur-gear collective drive |
| 3 | planetary gear |
| 4 | wheel bearing |
| 5 | wheel hub |
| 6 | rims |
| 7 | brake |
| 8 | brake caliper |

-continued

| Reference numerals | |
|---|---|
| 9 | brake actuation |
| 10 | axle body |
| 11 | emergency release device |
| 12 | handhole |
| 13 | gear intermediate shaft |
| 14 | sun gear |
| 15 | ring gear |
| 16 | planet carrier |
| 17 | planetary wheel |
| 18 | input |
| 19 | output |
| 20 | axle offset |

What is claimed is:

1. An electrical wheel drive for single wheel hub for a vehicle, the electrical wheel drive comprising:

a single wheel hub (5) supporting at least one tire;

a planetary gear (3) coupled to drive the single wheel hub (5);

a plurality of electric motors (1), each having a shaft offset from a rotational axis of the wheel hub for supplying driving power to only the single wheel hub (5) via the planetary gear (3), at least one wheel hub bearing (4) for supporting the single wheel hub (5) and facilitating rotation of the single wheel hub (5) relative to a stationary structure of the wheel drive;

at least one brake (7) coupled to the single wheel hub (5) for stopping rotation of the single wheel hub (5), and a spur gear assembly (2) for receiving a combined driving power from each of the plurality of electric motors (1) and for supplying a combined driving output, from each of the plurality of electric motors (1), as a single drive input to the planetary gear (3) to drive only the single wheel hub (5), and the spur gear assembly (2) comprising a spur gear directly connected by a single shaft to a sun gear of the planetary gear (3).

2. The electrical wheel drive according to claim 1, wherein a ring carrier of the planetary gear (3) is coupled to the single wheel hub (5) to supply driving power thereto; and the wheel bearing (4) is located axially, along a horizontal central axis of the single wheel hub (5), between the spur gear assembly (2) and the planetary gear (3).

3. An electrical wheel drive for single wheel hub for a vehicle, the electrical wheel drive comprising:

a single wheel hub (5) supporting at least one tire;

a planetary gear (3) coupled to drive the single wheel hub (5);

a plurality of electric motors (1), each having a shaft offset from an axis of the wheel hub for supplying driving power to the wheel hub (5) via the planetary gear (3);

at least one wheel hub bearing (4) for supporting the wheel hub (5) and facilitating rotation of the wheel hub (5) relative to a stationary structure of the wheel drive;

at least one brake (7) coupled to the wheel hub (5) for stopping rotation of the wheel hub (5), and the at least one brake (7) being a pneumatically actuated disc brake which operates as at least one of service brake, a parking brake, an emergency and an auxiliary brake; and a spur gear assembly (2) for receiving a combined driving power from each of the plurality of electric motors (1) and for supplying a combined driving output, from each of the plurality of electric motors (1), as a single input to the planetary gear (3) to drive the wheel hub (5); and the brake (7) having a brake caliper (8) situated completely beneath a horizontal central plane of the wheel hub (5), and a brake actuator (9) controlling operation of the brake (7), the brake actuator (9) being a combined diaphragm (24) and spring accumulator cylinder (23) disposed axially in a hollow axle body which is positioned inwardly of the wheel drive.

4. The electrical wheel drive according to claim 3, wherein the brake (7) is a single hydraulically actuated disc brake which operates as at least one of a service brake, a parking brake, an emergency and an auxiliary brake.

5. An electrical wheel drive for single wheel hub for a vehicle, the electrical wheel drive comprising:

a single wheel hub (5) supporting at least one tire;

a single planetary gear (3) comprising a sun gear, a planet carrier supporting planet gears and a ring gear, the planet carrier being supported by a stationary structure of the wheel drive, and the ring gear being coupled to the single wheel hub (5) to supply driving power thereto;

at least one wheel hub bearing (4) for supporting the single wheel hub (5) and facilitating rotation of the single wheel hub (5);

at least one brake (7) coupled to the single wheel hub (5) for stopping rotation of the single wheel hub (5);

a plurality of electric motors (1) for supplying driving power to only the single wheel hub (5) via the planetary gear (3);

a spur gear assembly (2) for receiving driving power from each of the plurality of electric motors (1) and for supplying a combined driving output, from each of the plurality of electric motors (1), as a single input to the single planetary gear (3) to drive only the single wheel hub (5), each of the plurality of electric motors (1) having a rotational axis, and the rotational axises of each of the plurality of electric motors (1) being off-set from a rotational axis of the spur gear assembly (2); and the plurality of electric motors (1), the spur gear assembly (2) and the single planetary gear (3) all being housed within the wheel hub (5) of the electrical wheel drive.

6. The electrical drive according to claim 5, wherein the brake (17) operates as at least one of a service brake, a parking brake, an emergency brake and an auxiliary brake.

7. The electrical individual wheel drive according to claim 5, wherein the brake (7) has a brake actuator (9) formed by two separate hydraulic cylinders, and a spring-loaded piston actuates a parking brake and a pressure-loaded piston actuates a service brake.

8. The electrical wheel drive according to claim 5, wherein each of the plurality of electric motors (1) is separately regulated.

9. The electric wheel drive according to claim 5, wherein at least one of the plurality of electric motors (1) is cooled by a source of one of air, water and oil.

10. The electrical wheel drive according to claim 5, wherein the planet gears rotate to transfer drive from the sun gear to the ring gear while the planet carrier is fixed to the stationary structure of the wheel drive and remains stationary during operation of the planetary gear (3).

11. The electrical wheel drive according to claim 5, wherein the ring gear (15) which is directly coupled to the single wheel hub (5) and rotation of the ring gear (15) supplies driving output power to the wheel hub (5).

12. The electrical wheel drive according to claim 5, wherein the single wheel hub (5) supports two rims (6) and each of the two rims (6) supports a tire thereon.

* * * * *